Oct. 17, 1933.　　　　J. LEDWINKA　　　　1,930,483
VEHICLE BODY CONSTRUCTION
Original Filed May 14, 1930　　2 Sheets-Sheet 1

INVENTOR.
JOSEPH LEDWINKA.
BY
John P. Tarbox
ATTORNEY.

Oct. 17, 1933.   J. LEDWINKA   1,930,483
VEHICLE BODY CONSTRUCTION
Original Filed May 14, 1930   2 Sheets-Sheet 2
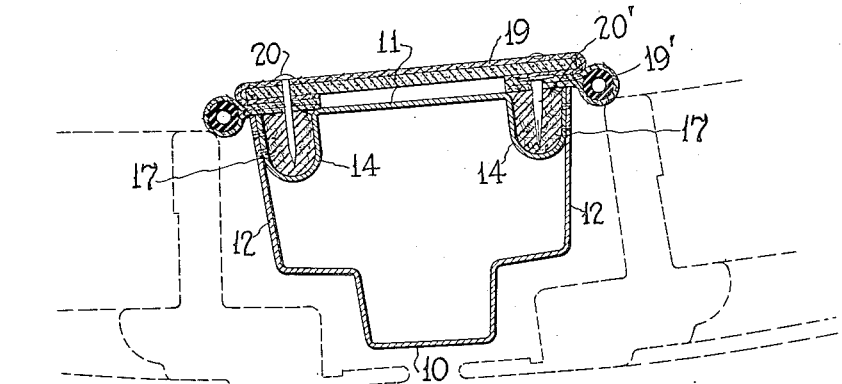
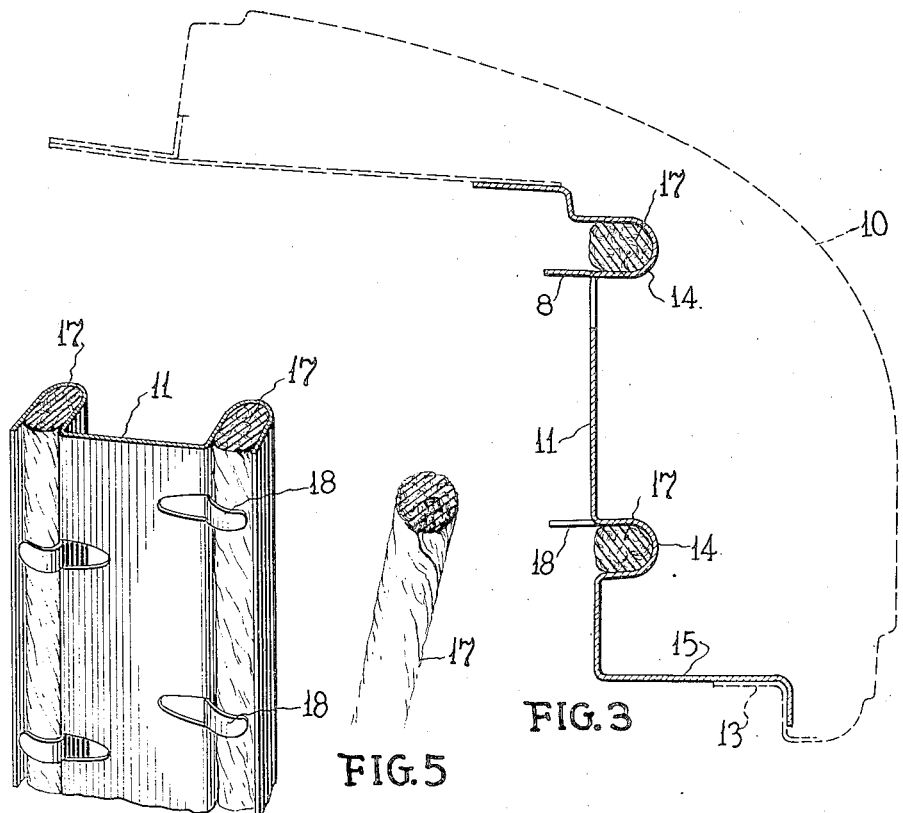
INVENTOR.
JOSEPH LEDWINKA.
BY John P. Tarbox
ATTORNEY.

Patented Oct. 17, 1933

1,930,483

UNITED STATES PATENT OFFICE 1,930,483

VEHICLE BODY CONSTRUCTION

Joseph Ledwinka, Philadelphia, Pa., assignor to Edward G. Budd Manufacturing Company, Philadelphia, Pa., a corporation of Pennsylvania Application May 14, 1930, Serial No. 452,217
Renewed July 21, 1933

14 Claims. (Cl. 296—28)

The invention relates to vehicle bodies and particularly to vehicle bodies having their walls made of metal.

In such bodies it has heretofore been rather difficult to provide a cheap and, in all respects, a satisfactory construction for applying the upholstery to the inside surface of the body wall, and it is a main object of my invention to provide a construction whereby the application of the upholstery to the inside of the wall is facilitated and the strength of the body wall unimpaired or even increased by the construction adapting it to readily apply such upholstery.

Another object of my invention is to lessen the cost of such bodies, and this, as well as the main object of the invention, are attained by forming in appropriate locations in metal parts forming the inner wall of the body relatively deep narrow channels into which a tacking strip can be pressed, and in providing means whereby the tacking strip may be secured in place by deforming a portion or portions of the metal adjacent the channel.

Other and further objects and advantages and the construction by which they are attained will become apparent from the following detailed description when read in connection with the accompanying drawings forming a part of this specification.

In the drawings,

Fig. 2 is a sectional view taken along the line 2—2 of Fig. 1 and showing the upholstery applied in the region of the B—C post, the doors adjacent the post being shown with their edges of outline.

Fig. 3 is a transvese section though the body wall above the rear quarter window opening, parts of the outer and inner faces of the wall being shown in dotted lines.

Fig. 4 is a fragmentary perspective view of the inner panel in the region of the B—C post showing the tacking strips secured in place.

Fig. 5 is a fragmentary section of a flexible tacking strip which may be employed.

Figure 1:
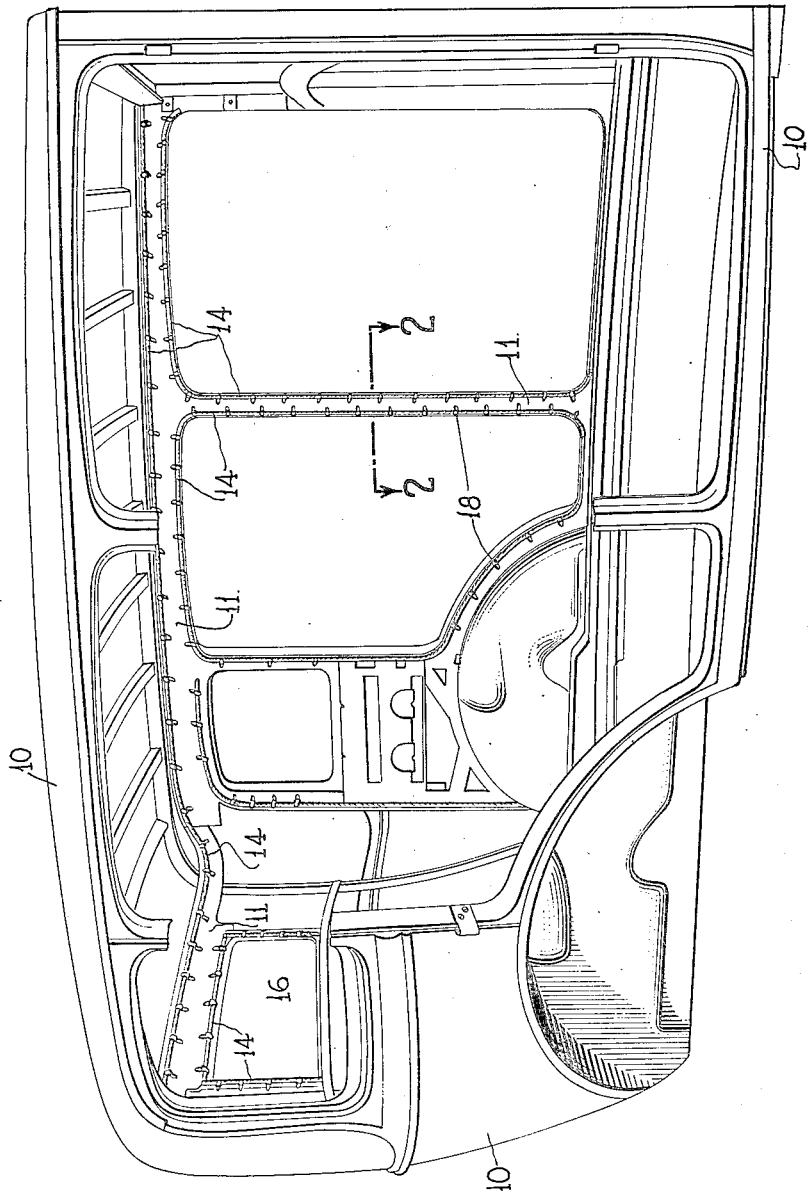
Fig. 1 is a perspective view of an automobile body to which the invention has been applied, parts being broken away to show the inside of the body.

The invention is shown applied to an automobile body construction in which the wall is built up of sheet metal panels comprising the outer paneling generally designated by numeral 10 and the inner paneling designated generally by 11 applied to the outer paneling around the door and window openings and generally where reinforcement of the outer paneling is desirable.

The outer paneling is generally flanged inwardly at the door and window openings as indicated at 12, Fig. 2 and at 13, Fig. 3. The inner paneling forming the inner face of the body wall is generally secured to the outer paneling in the margins of the door and window openings and in the outer margins to form with the outer paneling a hollow box section structure, giving to the wall great strength and rigidity, even if relatively light gauge sheet metal is used in the fabrication.

In the region of the B—C post, as shown in Figs. 2 and 4, the inner sheet metal paneling 11 is formed adjacent its edges with narrow relatively deep channels 14 opening inwardly, and the inner panel is adapted to be received telescopically between the inwardly extending flanges 12 of the outer panel and secured thereto by spot welding. The attachment by spot welding is facilitated by the formation of the channels at the edges of the panel, which permits the insertion of a spot welding electrode within the channel, and spot welding its outer wall directly to the flange 12 of the outer panel, which in this case, forms the jamb face of a doorway opening.

Above the door and window openings the channels 14 are likewise formed in the inner panel 11, shown in Fig. 3, as being outwardly flanged at 15 and secured to the inwardly extending flange 13 of the outer panel above the window opening. Above the door openings the connection of the outer panel to the inner panel is similar to that shown in Fig. 2 at the B—C post and the channels 14 above and adjacent the door openings merge through the rounded corners of the doors into the vertical channels at the vertical edges of the doorway openings, as is clearly shown in Fig. 1.

Adjacent the roof the inner panel 11 is formed with a channel 14 which extends from the front of the body at one side to and around the rear wall and forward to the front of the body at the opposite side, as clearly appears from the showing of Fig. 1.

Additional channels 14 are provided around the rear window opening 16 and at the rear vertical margins of the rear quarter window openings and in other regions where the attachment of the upholstery or interior trim is desired.

The inner paneling is in this embodiment of the invention comprised of stampings joined together and to the outer panel stampings as by spot welding, and the channels 14 are made continuous around the sides and tops of the window and doorway openings to facilitate the rapid application of the tacking strip.

The tacking strip comprises a flexible strip 17 which is preferably somewhat compressible, and it may conveniently be formed of a length of compressed twisted paper rope of circular cross section. When this is compressed into the narrow relatively deep channels 14 it is laterally compressed, as indicated in Figs. 2 and 4 and frictionally locked to the side walls of the channel.

To additionally and securely lock the tacking strip in place, the inner paneling is formed with struck out tabs 18 or other deformable means. These tabs 18 are struck out of the metal of the inner panel at suitable spaced distances along the channels 14, and before and during the application of the tacking strips to the channels, they project inwardly as shown in Fig. 3 so as not to interfere with such application. After the application of the tacking strip, the tabs are pressed down over the mouth of the channel and over the tacking strip seated in the channel to securely lock it therein.

The upholstery, as 19 and windlacing, as 19', Fig. 2, can then be readily secured by tacks 20 and 20' driven into the tacking strip.

From the foregoing description, it will be seen that applicant has provided a very simple and inexpensive construction for attaching the upholstery to automobile bodies of metal construction, which does away with the heretofore rather cumbersome and relatively inflexible wooden tacking strips and at the same time avoids the use of fastening means for the upholstery which are adapted to use with metal, such as the relatively expensive drive screws.

While the invention has been described in connection with automobile bodies made of sheet metal panels, it will be seen that certain features thereof are equally applicable to any metal body wall construction, and while it has been shown in the drawings and described in the specification as applied in certain locations of the body wall, it is to be understood, that I do not desire to limit myself in its application except as required by the spirit and scope of the following claims.

What I claim is:

1. In a vehicle body, outer face paneling and inner sheet metal reinforcing means joined thereto, the inner reinforcing means being formed with narrow relatively deep inwardly facing channels in the regions where upholstery is to be attached, and a flexible and compressible cordage tacking strip pressed into said channels.

2. In a vehicle body, a metal body wall formed in the regions where the upholstery or trim is to be secured with inwardly facing channels, and a flexible and compressible cordage tacking strip pressed into said channels and frictionally held therein.

3. In a vehicle body, a sheet metal inner panel conforming to the contour of the inner face of the body wall and formed in the regions where the upholstery is to be attached with narrow relatively deep inwardly facing channels, and flexible twisted paper cordage normally of a diameter greater than the width of said channels but compressible into the channels, whereby it is retained therein.

4. In combination, a sheet metal panel conforming substantially to the contour of the inner face of a body wall and formed with an inwardly presenting narrow relatively deep channel at least partially of curvilinear form, of a compressible flexible cordage tacking strip pressed into said channel and secured therein.

5. In combination, a sheet metal panel conforming substantially to the contour of a body wall and formed with a narrow relatively deep channel having a rounded bottom, and a twisted paper cordage tacking strip pressed into said channel and conforming substantially to the shape thereof.

6. In a vehicle body, a sheet portion having a relatively deep narrow channel for the reception of a tacking strip, a flexible paper cordage tacking strip pressed into said channel and having an exposed surface substantially in the plane of the mouth of the channel, and integral tabs on said sheet portion adjacent said channel, each tab having its hinge portion located approximately at the edge of the channel and adapted to be bent down upon the exposed surface of the tacking strip in a plane transverse to the channel to secure the tacking strip therein.

7. In a vehicle body, a sheet metal portion having a relatively deep narrow inwardly facing channel, and a flexible, compressible cordage tacking strip pressed into said channel and secured therein.

8. In an upholstery installation, a metallic base for the upholstery in the form of an elongated metal channel and a twisted and compressible cordage tacking strip embedded in said channel, frictionally interlocked with the side walls thereof and presenting through the open mouth of the channel an exposed surface substantially flush with the mouth of the channel to which fabric upholstery or the like may be attached by driving upholstery nails into the embedded cordage strip.

9. In an upholstery installation, a metallic base for the upholstery in the form of an elongated and tortuous metal channel and a flexible twisted and compressible cordage tacking strip embedded in said channel, frictionally interlocked with the side walls thereof and presenting through the open mouth of the channel an exposed surface substantially flush with the mouth of the channel to which the fabric upholstery or the like may be attached by driving upholstery nails in the embedded cordage strip.

10. In a vehicle body, a wall portion having a surface to be covered by upholstery or trim, and including means for attaching said upholstery or trim thereto, said means comprising a relatively deep narrow channel, and a flexible twisted compressed cordage tacking strip pressed into said channel, and means positively securing said strip in the channel.

11. In a vehicle body, a wall portion having a surface to be covered by upholstery or trim and including means for attaching said upholstery or trim thereto, said means comprising a relatively deep narrow channel, a flexible twisted compressed paper cordage tacking strip pressed into said channel to snugly fit the sides and bottom wall of the channel and having an exposed surface substantially flush with the mouth of the channel, and means for securing the strip in the channel.

12. In a vehicle body, a wall portion having a surface to be covered by upholstery or trim, and including means for attaching said upholstery or trim thereto, said means comprising a relatively deep narrow channel, and a flexible twisted compressed cordage tacking strip of substantially the same cross dimension as said channel laid lengthwise into said channel whereby tacking nails may enter the strip transversely, and means positively securing said strip in the channel.

13. In an upholstery installation, a metallic base for the upholstery in the form of an elongated metal channel, and a twisted and compressed cordage tacking strip laid lengthwise in said channel and of substantially the same cross dimension as said channel and presenting through the open mouth of the channel an exposed surface substantially flush with the mouth of the channel to which fabric upholstery or the like may be attached by driving upholstery nails transversely into the cordage strip, and means for securing said strip in the channel.

14. In an upholstery installation, the combination of a relatively deep preformed narrow channel and a flexible twisted cordage tacking strip laid lengthwise into the channel whereby upholstery nails may enter the strip transversely, and means positively securing said strip in the channel, said twisted cordage strip constituting means to grip the shank of a nail to hold the nail therein and upholstery carried thereby.

JOSEPH LEDWINKA.